Oct. 15, 1957     O. B. BACH     2,809,901
PROTECTIVELY COATED METALS AND PROCESS OF COATING SAME
Filed Oct. 22, 1952     5 Sheets—Sheet 1

Inventor
Oscar B. Bach,
By Howson and Howson,
Attorneys.

Oct. 15, 1957   O. B. BACH   2,809,901
PROTECTIVELY COATED METALS AND PROCESS OF COATING SAME
Filed Oct. 22, 1952   5 Sheets-Sheet 2

Inventor
Oscar B. Bach
By his attorneys
Howson and Howson

Oct. 15, 1957  O. B. BACH  2,809,901
PROTECTIVELY COATED METALS AND PROCESS OF COATING SAME
Filed Oct. 22, 1952  5 Sheets-Sheet 3

INVENTOR.
OSCAR B. BACH
BY HIS ATTORNEYS
Howson and Howson

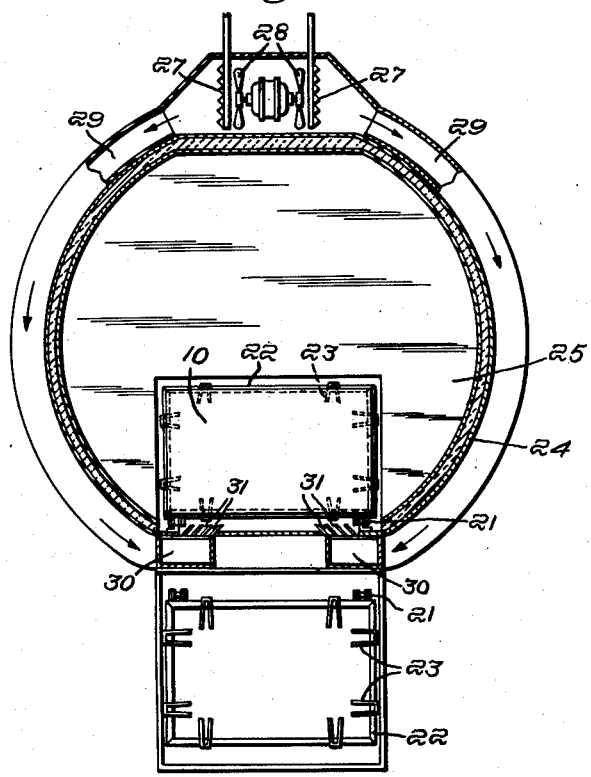

United States Patent Office 2,809,901
Patented Oct. 15, 1957

2,809,901

PROTECTIVELY COATED METALS AND PROCESS OF COATING SAME

Oscar B. Bach, New York, N. Y.; Max Grunt, Charles L. Borden and William Esbitt, executors of said Oscar B. Bach, deceased Application October 22, 1952, Serial No. 316,226

18 Claims. (Cl. 117—46)

This invention relates to a method for protectively coating metals and to the composite article resulting from the novel method.

It has been known for many years to protect metals of various kinds by applying to their surfaces materials having a greater resistance to corrosion, weathering or the like, than the metals themselves. Tin, nickel and chromium plating, galvanizing, and phosphate treatments such as "Parkerizing" and "Bonderizing" are a few familiar processes of this nature. Most of these prior methods have had certain drawbacks. In some instances the coating or treatment is not continuous, pinholes being left which extend through to the metal and furnish starting points for corrosion. In other cases, the coating does not adhere to the metal with sufficient tenacity and is easily ruptured by flexing or knocking. Some treatments, while technically effective, involve the use of costly materials and are therefore too expensive for large scale commercial and industrial applications. Many processes are subject to more than one of these defects.

The present invention provides a simple inexpensive method whereby any of a large class of metals may be provided with a protective coating which is light in weight, firmly adherent and highly resistant to the sustained action of many corrosive substances. In addition, metals treated by my process have increased surface hardness and permanent surface coloration. The method of the present invention involves materials which are inexpensive and generally easy to obtain, and apparatus which is easy to build and cheap to operate.

Metals treated according to my novel process have a coating which will give the fullest protection against corrosion or attack by gases or spray. It will, moreover, protect liquid or solid substances in contact with the coated object from contamination by the metal. It is hard, tough, and abrasion-resistant. Sharp bending produces no break, and even after deep drawing the enlarged area is still covered with a homogeneous coating giving full protection against corrosion to the whole area. The coated sheets can be rolled within certain limits without injuring the coating or destroying the protection against corrosion.

According to the present invention, the metal surface to be coated is first rigorously cleaned, i. e., freed from oil, grease, dirt, and scale, and is also roughened or etched to at least a small degree. The cleaning and roughening may be accomplished by mechanical means such as sandblast or by chemical etching agents. The clean, roughened surface is then coated with a heat polymerizable organic material, and is heated to a temperature in excess of about 350° F. and no higher than about 680° F. to convert the material to a tough, flexible, non-tacky polymer. After the polymer has formed, the coated metal is then heated at a temperature in excess of about 680° F. for a time sufficient to carbonize only the outer layer of the polymer.

The invention also provides a new article of manufacture consisting of a metallic body and an outer protective coating, the coating being characterized by an inner layer of a heat polymerized organic substance and a carbonized outer layer of the polymerized organic substance.

In the drawings:

Figure 5 is a vertical section taken on the line 2—2 of Fig. 4.

Figure 1:
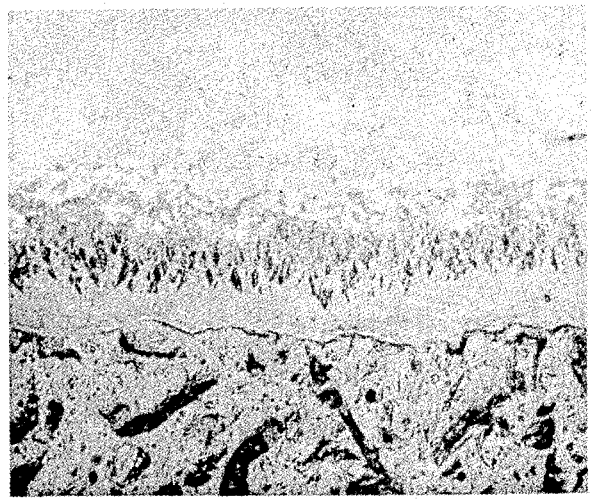
Figure 1 is a microphotograph, greatly enlarged, of a cross-section of a piece of metal which has been treated according to my novel process.
Figure 2:
Figure 2 is a drawing made from a microphotograph, greatly enlarged, of a cross-section of a piece of metal which has received two coatings according to my novel process.

The character of my novel coating as applied to a piece of steel is shown in Figs. 1 and 2. In obtaining the microphotograph of Fig. 1 cold rolled steel was coated with linseed oil and subsequently fired in two stages according to my novel process. Then a Bakelite mounting was applied over the coating. The mounted sample was sliced at an angle of approximately 10° to the surface of the steel and the photograph of Figure 1 was then made perpendicular to the sliced surface at a magnification of 500 times. In Fig. 1 the area 1 is at the steel base. The Bakelite mounting is shown as 1a. Next to the steel is a layer of heat polymerized linseed oil 2 and directly above that and below the Bakelite mounting is the carbonized polymer outer layer 2a. Thus, the coating as a whole consists of a pyrogenic or heat formed polymer next to the metal and a layer of carbonized pyrogenic polymer on the outer surface.

In practice it has been found that the under layer of pyrogenic polymer is a rust red. When the carbonized outer layer is present, the coating taken as a whole is a jet black color in daylight. The outer layer itself, however, when removed from the red underlayer, appears translucent in daylight.

Any metal may be treated according to my novel process which will withstand the heat treatment of the process, but generally, the metals will be capable of withstanding a temperature of at least 680° F. The melting point of the metal need not necessarily be above the carbonization temperature, since if the exposure time for carbonization is sufficiently brief, and the mass of the coated object sufficiently great, the metal may not absorb sufficient heat to fuse. Obviously, there must be no violent reaction between the metal and the organic compound. Particularly effective results may be obtained with various grades of iron and steel, with or without alloying or plating elements; with the light metals, especially magnesium and aluminum; and with copper and brass.

The coating material itself may consist principally of any organic substance which will form a pyrogenic polymer, i. e., which is adapted to be polymerized, or further polymerized, by heat. The most useful materials are thermosetting resins, drying oils, generally of vegetable origin, semi-drying oils and drying oil acids, i. e., unsaturated aliphatic acids. Examples of oils applicable to the present process are linseed, perilla, tung, oiticica, chia, fish, poppy-seed, safflower, soybean, sunflower, walnut, castor, dehydrated castor, cottonseed, corn, candelnut, hempseed, madia, cameline, beechnut, kapok, sesame, curcas, brazil-nut, ravison, rape, jamba and croton oils. Drying oil acids include linoleic, linolenic, arachedonic, clupanadoic, eleostearic, ricinoleic and licanic acids. Although castor oil is not generally considered a drying oil and ricinoleic acid is not considered a drying oil acid, both have been found operable in the present invention, the one acting as a drying oil and the other as a drying oil acid. It is theorized that when subjected to the heat of the process, these compounds are dehydrated and thus rendered, in effect, a drying oil and drying oil acid.

In addition to the thermosetting resin, drying oil, semi-drying oil, or drying oil acid, the coating material may contain a drier and a wetting agent. Driers which may be used are those commonly employed in the paint industry and include the metallic soaps or salts of fatty and resin acids, such as stearates or resinates, litharge, lead carbonate, basic lead carbonate, lead acetate, manganese dioxide, umbers and ochres, manganese borate and acetate, cobalt acetate, zinc oxide, and calcium oxide and hydroxide.

Wetting agents may include mineral oils and asphalts.

It should be understood that while in many situations I prefer to include in the coating a drier and a wetting agent as well as the polymerizable organic substance, satisfactory results can be obtained by the use of the organic substance alone, or by using the organic substance with a drier or a wetting agent.

As pointed out above, it is essential that before any organic substance is applied, the surface of the metal be clean, i. e., free from oil, grease, dirt and scale, and that the surface of the metal be etched or roughened, at least to a small degree. It is thought that by etching or roughening, at least some of the "disturbed metal" is removed from the surface of the metal, leaving a more receptive basis for the coating. See Kehl, Principles of Metallographic Laboratory Practice, McGraw Hill, New York, 1943. If this is not done, the coating will not adhere properly to the metal and corrosive materials will penetrate the coating and attack the metal. Any suitable means for accomplishing cleaning and roughening may be used as for instance, etching with mineral acids such as hydrochloric or nitric acid, or sandblasting.

If nitric acid is used, the passivating effect commonly experienced with that acid is added to the protection of the coating itself.

The metal having been cleaned and its surface etched or roughened, the organic substance alone, or in admixture with a drier or wetting agent or both, may then be applied. Any convenient method of application may be employed, as for example, dipping, brushing, wiping or spraying.

When the organic substance has been applied to the metal surface, the coated metal is introduced into a furnace or oven and its surface raised to a temperature greater than about 350° F. but less than about 680° F. and held in that range until a pyrogenic polymer has formed. The surface temperature is then raised to a value greater than about 680° F. and maintained at that value until the outer layer, and only the outer layer, of the pyrogenic polymer has carbonized. The metal is then quickly removed from the furnace.

The manner in which the coated article is subjected to the action of heat is subject to considerable variation. It is preferred that the heating be accomplished in at least two separate zones which are kept at different temperatures. According to the preferred process, the coated metal is first subjected to one or more low heat zones where the pyrogenic polymer can form. After this has been done, it is moved to a high heat zone where the outer layer of the pyrogenic polymer is carbonized. It should be understood, however, that the important thing is that the temperature of the organic film be first at a relatively low value and then at a high value. The same result may therefore be accomplished if a furnace having a single temperature zone is employed, since the temperature of the metal and of the organic film may rise quite gradually depending on the mass and nature of the metal, the pyrogenic polymer forming at the low temperature and being carbonized from the outside as the surface temperature approaches the temperature of the furnace.

The single step process is somewhat more difficult to control and it is generally preferred to use at least one low temperature stage in which the polymerization can take place.

It is possible, of course, to break up the polymerization stage into a number of different sub-stages. For example, a preferred mode of operation is to preheat the freshly coated metal in one oven to 300° F., then to heat in a second oven to between 350 and 650° F. until the polymer has been formed and finally to heat in a third oven to raise the temperature quickly to between 800 and 900° F. (say 860° F.) to effect carbonization of only the outer layer of the polymer.

It has been found that if the metal surface is raised to a temperature in excess of 680° F. before the pyrogenic polymer has had a chance to form, satisfactory adherence and corrosion resistance are not obtained. The reason for this is not entirely clear, but it is thought, insofar as ferrous metals are concerned, that above this temperature a blue oxide will form underneath the oil film if polymerization has not been completed; and that this oxide prevents the intimate association between the polymer and the metal which is obtained when the critical conditions are observed.

No upper temperature limit is known beyond which carbonization will not occur. However, it is essential that carbonization be limited to the outer layer of the polymer. If the entire polymer is carbonized both the adherence and the protective qualities of the coating are lost. For ease of control it is therefore preferred to conduct the carbonization step at below 1200° F. and preferably between 800 and 900° F.

It is further essential that the carbonization step be conducted at a temperature in excess of 680° F. It is possible to obtain a coating having a superficial resemblance to the coating according to the invention by allowing the oil coated metal to remain at substantially lower temperatures for an extended time. However, upon comparison of such coatings with coatings processed within the preferred temperature ranges, several very important distinctions are to be noted. Thus, the color of the low temperature coating has a distinct brownish cast rather than the jet black appearance previously referred to. More important, the low carbonization temperature coatings have decidedly inferior protective qualities. To illustrate this, and also to illustrate the effect of exceeding the maximum polymerization temperature set forth, and the effect of omitting the preliminary cleaning and roughening treatment, the following experiment is described:

Three sheets, referred to hereafter as "A," "B," and "C," of cold rolled steel 0.030" thick were etched by immersion in 5% $HNO_3$ for 15 seconds at 50° C. The sheets were then each coated on both sides with boiled linseed oil. Sheet "A" was then raised to a temperature of 550° F. and maintained at that temperature for about 600 seconds until the oil was converted to a copper red polymer. Sheet "A" was then brought to a temperature of about 728° F. and maintained at that temperature for approximately 900 seconds at which time the coating appeared jet black in daylight.

Sheet "B" was similarly processed except that the corresponding temperatures were 550° F. and 660° F., the last named temperature being maintained for 2 hours.

Sheet "C" was similarly processed at 738° F. and 817° F. for 600 and 600 seconds respectively.

A fourth sheet, "D," was treated in a manner similar to sheet "A" except that the preliminary etching was omitted.

The four sheets were then subjected to the following test:

A measured circle ⅛" in diameter was scribed on one surface of each sample and the coating removed from within the circle. The plates were then suspended in a 50% solution of aqua regia. After approximately 6 hours the plates were removed and examined.

In the case of plate "A," the metal within the circle had dissolved and the acid had reached the coating on the far side of the sheet. The size of the circle remained the same.

In the case of plates "B," "C," and "D," the metal in the vicinity of the circle had been attacked. The acid ate underneath the coating and spread, causing the surface of the coating to be blistered.

It is possible, and in some cases, desirable to apply two or more complete superposed coatings, each having a polymer and carbonized polymer layer. Such a coating is shown in Fig. 2, which is a drawing made from a microphotograph prepared in a manner similar to that described in connection with Fig. 1, above. In Fig. 2, 30 represents a metal object, 31 is an inner polymer layer, 32 an intermediate carbonized layer, 33 an intermediate polymer layer, and 34 an outer carbonized layer. A Bakelite mounting used in making the microphotograph is shown as 35.

In some instances, it may be found convenient merely to polymerize a first coating, and then apply a second coating, carbonizing the outer layer of such second coating at a temperature in excess of 680° F. to a jet black color.

Where drying oils, semi-drying oils, or drying oil acids are used, the molecular structure of the pyrogenic polymer which forms at 350° F. and above is not entirely understood, but clearly there is a difference between it and that polymer which is formed by the ordinary air drying of linseed oil. The pyrogenic polymer is tough and flexible whereas the ordinary air-dried linseed oil tends to be tacky. It is thought that in the pyrogenic polymer, the glyceride chains are interconnected by carbon to carbon bonds, whereas in an oxidation polymer, the glyceride chains are interconnected by oxygen bridges.

While the exact nature of the outer coating is not known, it is referred to herein as a carbonized layer and the process by which it is obtained as a carbonization process, because during the heating at the elevated temperature the chemical and physical nature of the polymer is altered and fumes are given off, presumably resulting in a higher carbon to hydrogen ratio in the outer-layer where the heat treatment is effective, then is present in the coating initially produced as the result of the polymerization.

The transition of the organic substance from one stage to the next as it passes through a furnace is marked and the differences are readily observed. For example, when a drying oil, semi-drying oil, or drying oil acid is applied it is generally a corn yellow color. As it undergoes polymerization, a distinct color change is observed, the coating turning to a rust or copper red. Then, as the temperature rises, and carbonization begins to set in, considerable quantities of fumes come from the metal and the color change is to a chocolate brown and finally to a black. When the fumes have ceased and the surface of the object is a uniform jet black under daylight, it must be removed from the furnace and cooled. Continued exposure to the temperature of the carbonizing zone would cause carbonization of the entire coating, which, as has been pointed out before, is undesirable.

It will be evident that my novel process can be carried out in the simplest kind of apparatus. However, two forms which the apparatus may take are shown herewith.

Figure 3:
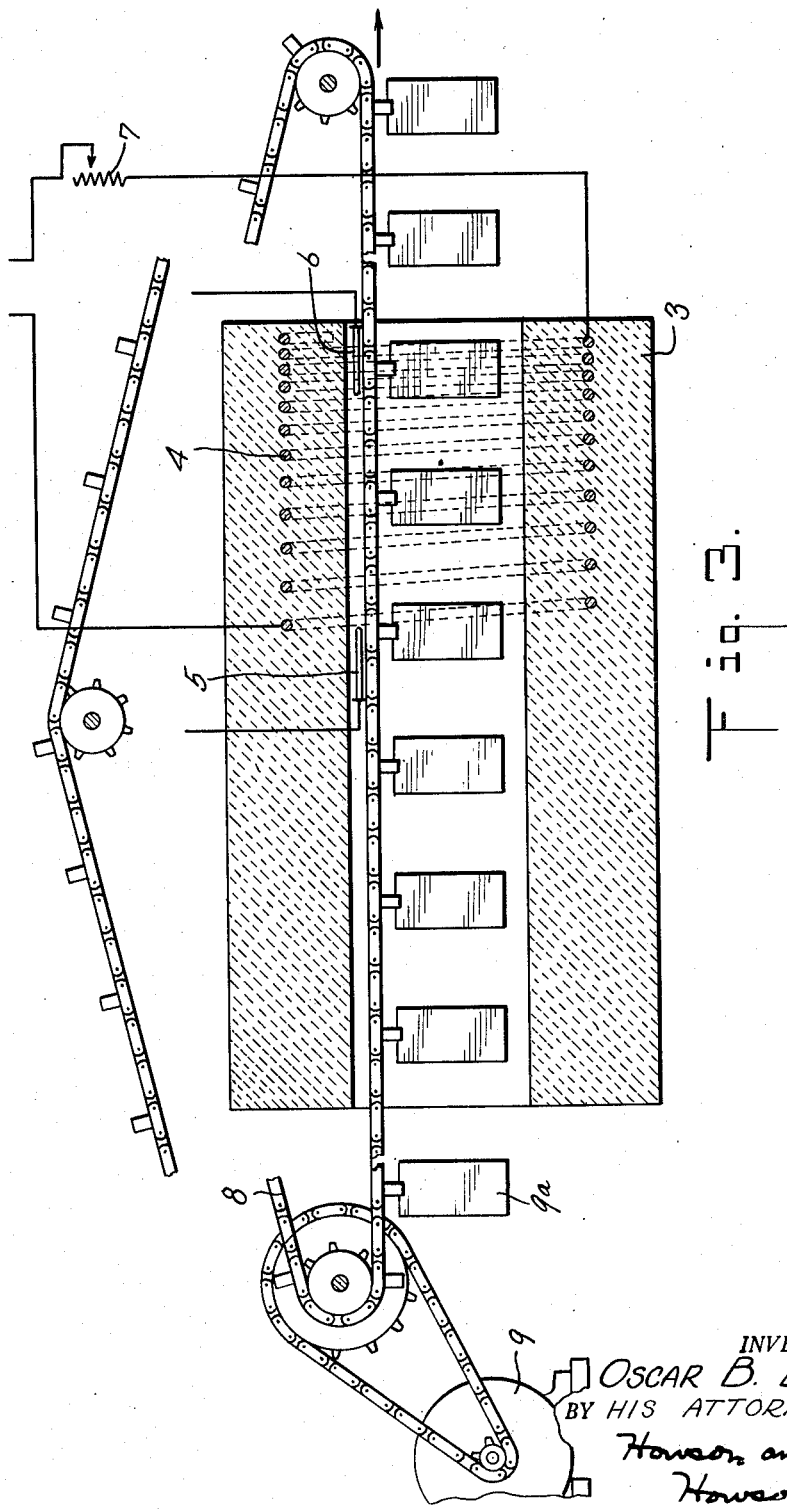
Figure 3 is a view partly in elevation, partly in vertical section, of one form of apparatus in which my process may be carried out.

The apparatus of Fig. 3 comprises simply a muffle furnace 3, having a graduated winding 4. Temperatures in the furnace are registered on thermocouples 5 and 6 and may be controlled by variable resistor 7. A chain conveyor 8 powered by variable speed motor 9 carries coated material 9a through the furnace. For determining the actual surface temperatures, a thermocouple may be held mechanically against the metal plate and the coating applied over the thermocouple. For practical operations, however, a definite relation can be established between the surface and oven temperatures for a particular kind of sample and exposure time, so that the actual temperatures used in day to day operation are oven temperatures.

Figure 4:
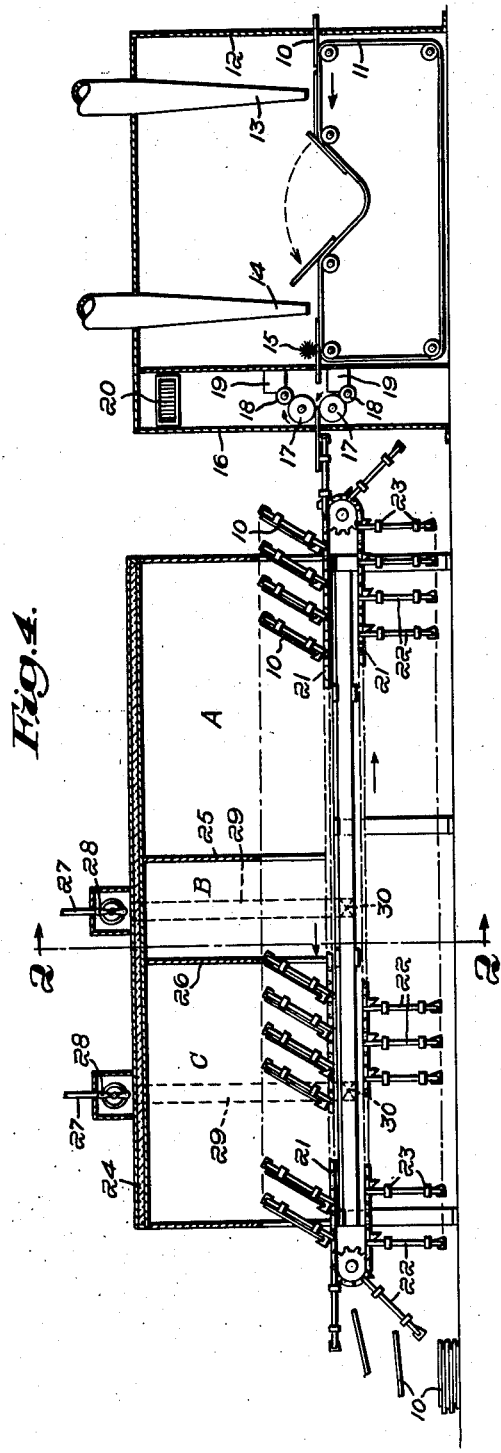
Figure 4 is a view partly in elevation, partly in vertical section, of a second form of apparatus which may be used in carrying out my novel process.

A somewhat more elaborate apparatus is shown in Figs. 4 and 5. In those figures the metal sheets or other objects to be coated are designated at 10, and are shown as being borne by a conveyor 11 through a cleaning chamber 12 where both surfaces of each sheet are subjected to a cleaning or degreasing treatment, as by means of a spaced pair of stationary sandblast nozzles 13 and 14.

The delivery apertures of the nozzles are as long as the sheet is wide so as to cover the entire surface of the sheet, and the conveyor 11 is so designed as to cause the sheets to be reversed during their passage through the chamber 12 so that the sandblast from nozzle 13 will clean one face of the sheet and the sandblast from nozzle 14 will clean the opposite face of the sheet.

After passing nozzle 14, any sand particles left on the surfaces of the sheet are brushed off by a suitable brush roller 15.

From the cleaning chamber 12, the clean sheets are carried by the conveyor 11 into a coating chamber 16 where liquid films are applied to both surfaces of the sheets by means of a pair of coating cylinders 17 fed by rollers 18 from tanks 19. The separation of the coating cylinders 17 is adapted to the thickness of the sheet plus the desirable thickness of the coating films.

It is of importance that any dust or suspended particles be excluded from the coating chamber, and for this purpose said chamber is provided with an inlet 20 through which filtered air may be introduced.

From the coating compartment 16 the coated sheets pass on to a conveyor 21 to which are pivoted at spaced points a plurality of suitable frames 22 equipped with appropriate holders 23.

The design of said frames and holders is such as to reduce to the minimum the area of surface contact with the sheet, so as to expose the sheet fully and freely to the oven gases and to the oven radiation and avoid retardation of the heat treatment at the spots where the sheet touches the holders. It has been proved useful to keep the heating of the holders at the same speed as the heating of the objects treated. This is secured by keeping the sections of the holders in proportion to the sections of the treated objects. If desirable, the common rise in temperature of objects and holders can be facilitated by pre-heating the latter.

The conveyor 21 operates within a tunnel oven 24 which is sub-divided by suitable baffles 25 and 26 which may be adjustable, into three successive compartments of different length, designated A, B, and C, in Fig. 4.

The oven is directly heated by combustion from suitable sets of burners 27 situated outside of the oven over compartments B and C. The burners are fed by gas or liquid fuel and from their flames the gases are forced by fans 28 into ducts 29 encircling said compartments. These ducts deliver into longitudinal channels 30 extending substantially the full length of the oven near the bottom and at opposite sides thereof (see Fig. 5). The channels 30 connect by vents 31 with the interior of the oven. These vents are so inclined as to be directional in action, the left hand series of vents causing a circulation of the heated gases in one direction and the right hand side of vents causing a circulation in the opposite direction.

Compartment A is heated by escape of gases from compartment B, and compartments B and C are heated by the combustion gases entering the oven through vents 31. The arrangement of ducts and vents is such that compartment C is heated to a higher temperature than compartment B.

The finished sheets are discharged from the frames 22 at the far end of compartment C and are accumulated in a stack for removal. The empty frames are returned by the lower flight of the conveyor 21 underneath the oven to the coating chamber 16 in readiness to receive new sheets.

The means for controlling the conduct of temperature in the furnace are the following:

(1) The division of the furnace into three compartments by the adjustable baffles, the location of these baffles determining the lengths of the three compartments.

(2) The dimensions of the complete arrangement of burners, ducts and vents belonging to the compartments B and C.

(3) The feeding of gas and air to the burner systems for compartments B and C.

By proper choice of the said means, which might be varied according to the dimensions of the treated objects, and to the thickness of the coating, such conduct of temperature within the furnace as is desirable can be secured.

The objects are carried through the furnace by the conveyor at a uniform speed through the whole length of the furnace. The lengths of the three compartments and the distribution of temperature are such that the objects remain in each zone of temperature only so long as required by the process. It is understood, however, that other means giving an equivalent conduct of the temperature may be employed.

My process is applicable to metal sheets and to all kinds of articles fabricated therefrom, as well as to forgings, castings, and machined parts, where protection is desired against corrosive agents, chemicals, sea water, brine, salt water spray and like corrosive mediums.

It is particularly useful in producing protectively coated sheets for canned food and parts for airplanes and motor cars.

Sheets treated in accordance with my invention are at least the equivalent, protectively, of tinned iron plate, galvanized iron, nickeled iron sheet, chromium-plated or otherwise protected iron sheet, and stainless steel.

The following examples are illustrative of my process, although my invention is not limited to the specific substances and conditions described.

EXAMPLE I

A sheet of 0.030" cold rolled steel was cleaned and etched by immersion in 5% HNO₃ for 15 seconds at 50° C. It was then coated with boiled linseed oil and introduced into the apparatus of Fig. 3. After 140 seconds, a temperature of 637° F. had been reached and the sheet was a copper red color. After 200 seconds carbonization of the outer layer of the polymer had occurred, a temperature of 690° F. having been reached. The product was jet black and had excellent properties of adherence.

EXAMPLE II

A plate of 0.030" cold rolled steel was etched with a 5% solution of HNO₃ and then coated with linseed oil to which a small amount of Egyptian asphalt had been added. The coated plate was then suspended in a furnace whose temperature, measured by an unshielded thermocouple approximately ½" from the furnace wall, was 710° F. After 68 seconds, the temperature of the plate had risen to 627° F. and it had assumed a copper red color. After 115 seconds, the temperature of the plate had gone to 707° F. and its surface was jet black. It was immediately removed from the furnace. Inspection of the under layer of the coating showed it to be of copper color. The adherence of the sample was excellent.

EXAMPLE III

Ordinary black iron sheets were coated with linseed oil in the apparatus of Figs. 3 and 4, maximum surface temperatures in the three zones being about 300° F., 650° F., and 860° F. They were then compared with iron protectively coated in various other ways. The results of the comparative tests are given below in Tables I and II.

Table I

| Solution Number | Time of Test | Commercial Tin Plate | Black Iron Treated in Accordance With My Invention |
|---|---|---|---|
| #1 | 1 Hour | Badly corroded | No attack. |
| #2 | do | do | Do. |
| #3 | do | do | Do. |
| #4 | do | Badly corroded at the end of 15 minutes. | Do. |
| #3 | 2½ Hours | Badly corroded | Do. |
| #1 | 3 Hours | do | Do. |
| #2 | do | do | Do. |
| #4 | do | do | Do. |
| #3 | 5 minutes | Corrosion starting at solution level. | Do. |
| #3 | 10 Minutes | Corrosion entire length of strip | Do. |
| #3 | 20 Minutes | Corroded | Do. |
| #3 | 40 Minutes | Badly corroded | Do. |

Solution No. 1=25% lactic acid.
Solution No. 2=25% tartaric acid.
Solution No. 3=10% hydrochloric acid.
Solution No. 4=3% sulphuric acid and 2% nitric acid.

Attention is drawn to the fact that in every test with every one of the several different testing acids listed in Table I, my treated sheet resisted attack by the same acids which badly corroded the tin plate.

The following table shows the results of a comparative test of ordinary black iron treated in accordance with my invention and conventional galvanized iron.

Table II

| Time of Test | Commercial Tin Plate | Commercial Galvanized Sheet | Black Iron Treated in Accordance With My Invention |
|---|---|---|---|
| 30 Minutes | Entirely removed | Entirely removed | No attack. |
| 117 Hours | | | Attack on edges only. |

PICKLING SOLUTION USED IN FOREGOING TEST

| | Percent |
|---|---|
| Sulphuric acid C. P | 5. |
| Nitric acid C. P | 2.500 |
| Glycerine | .625 |
| Water | 91.875 |
| | 100.000 |

Attention is drawn to the fact that in the tests listed in Table II, both the tin plate and the galvanized coatings were entirely removed after 30 minutes, whereas my treated material showed no attack, and that after 117 hours my treated material showed attack at the edges only.

The present application includes material from my co-pending application Serial No. 120,621, filed October 11, 1949, and now abandoned. Application Serial No. 120,621 includes material taken from my application Serial No. 445,345, filed June 1, 1942, and abandoned subsequent to the filing of said application Serial No. 120,621.

What is claimed is:

1. A process for forming a protective coating on metal which comprises cleaning and roughening the surface of said metal, coating the clean, roughened surface with an organic material selected from the group consisting of drying oils, semi-drying oils, and drying oil acids, heating said coated metal to a temperature between about 350° F. and about 680° F. to convert said organic material to a pyrogenic polymer, and then heating said polymer-coated metal to a temperature in excess of 680° F. to carbonize only the outer layer of said polymer.

2. A process as claimed in claim 1, wherein the organic material is a drying oil.

3. A process as claimed in claim 1, wherein the organic material is linseed oil.

4. A process as claimed in claim 1, wherein the metal is cleaned and roughened by treatment with a chemical etching agent.

5. A process as claimed in claim 1, wherein the cleaning and roughening is carried out by sandblasting.

6. A process for forming a protective coating on metal which comprises cleaning and roughening said metal, coating said metal with an organic material selected from the group consisting of drying oils, semi-drying oils, and drying oil acids, heating said coated metal in a first stage to a temperature below 350° F. to set said organic material, heating said metal in a second stage to a temperature between about 350° F. and 680° F. to convert said organic material to a pyrogenic polymer, and then heating said polymer-coated metal in a third stage to a temperature in excess of 680° F. to carbonize only the outer layer of said polymer.

7. A new article of manufacture which comprises a metallic body in combination with an integral coating adhered to the surface of said metallic body, said integral coating having an inner layer of a heat polymerized organic substance selected from the group consisting of drying oils, semi-drying oils, and drying oil acids, the polymerization of said organic substance having been brought about by heating said substance to a temperature of from about 350° F. to about 680° F.; and a carbonized outer layer of said organic substance, the carbonization of said outer layer having been brought about by heating the pyrogenic polymer to a temperature in excess of 680° F.

8. An article as claimed in claim 7, wherein the organic substance is a drying oil.

9. An article as claimed in claim 7, wherein the organic substance is linseed oil.

10. A new article of manufacture which comprises a metal body in combination with an integral protective coating adhered to the surface of said metal body, said integral coating having a plurality of inner layers, each composed of a polymerized organic material selected from the group consisting of drying oils, semi-drying oils, and drying oil acids, the polymerization of said organic material having been brought about by heating it to a temperature between about 350° F. and about 680° F., and an outer layer, composed of polymerized organic material which has been carbonized, the carbonization of said outer layer having been brought about by heating the heat polymerized organic material to a temperature in excess of 680° F.

11. A new article of manufacture which comprises a metal body in combination with an integral protective coating adhered to the surface of said metallic body, said integral coating having a plurality of layers composed alternately of a heat polymerized organic material selected from the group consisting of drying oils, semi-drying oils, and drying oil acids, the polymerization of said organic material having been brought about by heating it to a temperature between about 350° F. and about 680° F., and a carbonized heat polymerized organic material selected from the group consisting of drying oils, semi-drying oils, and drying oil acids, the carbonization of said heat polymerized organic material having been brought about by heating it to a temperature in excess of about 680° F., the outer layer of said coating being carbonized and the layer next to the metal being uncarbonized.

12. A process for forming a protective coating on metal which comprises cleaning and roughening the surface of the metal, coating the metal with an organic, pyrogenically polymerizable material selected from the group consisting of drying oils, semi-drying oils, and drying oil acids, heating the coated metal to a temperature between about 350° F. and about 680° F. to polymerize said material, then heating the polymer coated metal to a temperature in excess of about 680° F. to carbonize the outer layer of the pyrogenic polymer and removing the coated metal from the influence of the carbonization temperature while the layer of polymer next to the metal remains uncarbonized.

13. The method of applying a hard, tough, non-porous and strongly adherent protective coating to a ferrous metal object, which comprises cleaning and roughening the surface of said object, applying a drying oil to the surface of the object to be coated, thereafter gradually heating the object to about 300° F. to preheat the metal to be coated, then heating to between 350° F. and 650° F. for a sufficient length of time to completely polymerize the coating, then rapidly increasing the heating temperature to between 800° F. and 900° F. and maintaining such elevated temperature to carbonize only the outer layer of said polymerized coating.

14. The method of applying a hard, tough, non-porous and strongly adherent protective coating to a ferrous metal object, which comprises cleaning and roughening the surface of said object, applying a drying oil to the surface of the object to be coated, thereafter gradually and slowly heating to about 650° F. until the film is polymerized, then rapidly increasing the heating temperature to between 800° F. and 900° F. and maintaining such elevated temperature to carbonize the outer layer of the polymerized drying oil only, and form a substantially non-corrodible deposit on the metal.

15. The method of applying a hard, tough, non-porous and strongly adherent protective coating to a ferrous metal object, which comprises cleaning and roughening the surface of said object, applying a drying oil to the surface of the object to be coated, thereafter gradually and slowly heating the object to approximately 300° F. to preheat the metal, then heating to about 650° F. to completely polymerize the coating, then rapidly increasing the heating temperature to between 800° F. and 900° F., and maintaining such elevated temperature to carbonize the outer layer of said polymerized coating only, and to form a substantially non-corrodible deposit on the metal.

16. A process for forming a protective coating on metal which comprises cleaning and etching the surface of said metal, coating the cleaned, etched surface with an organic material selected from the group consisting of drying oils, semi-drying oils and drying oil acids, heating said coated metal to a temperature between about 350° F. and about 680° F. to convert said organic material to a reddish-colored polymer and then heating the polymer-coated metal to a temperature in excess of 680° F. until only the outer layer of said polymer has been converted to a black carbonized layer.

17. A process for forming a protective coating on metal which comprises cleaning and etching the surface of said metal, and thereby removing at least a part of the disturbed metal from said surface, coating the clean, etched surface with an organic material selected from the group consisting of drying oils, semi-drying oils and drying oil acids, heating said coated metal to a temperature between about 350° F. and about 680° F. to convert said organic material to a pyrogenic polymer, and then heating said polymer-coated metal to a temperature in excess of 680° F. to carbonize only the outer layer of said polymer.

18. A process for forming a protective coating on metal which comprises cleaning and roughening the surface of the metal, coating the cleaned roughened surface with an organic material selected from the group consisting of drying oils, semi-drying oils and drying oil acids, introducing said coated metal into a first heating zone having a temperature in excess of about 350° F. and maintaining said coated metal in said first heating zone until the temperature of the surface of said metal is brought to between about 350° F. and about 680° F. and said organic material has been converted to a pyrogenic polymer; and then introducing the polymer coated metal into a second heating zone having a temperature in excess of 680° F., maintaining said metal in said second heating zone until the surface of said metal is brought to a temperature in excess of 680° F. and only the outer layer of said pyrogenic polymer has been carbonized, and withdrawing said metal from said second heating zone after the outer layer and only the outer layer of said pyrogenic polymer has been carbonized, whereby said metal is given a coating having an inner layer of pyrogenic polymer and an outer layer of carbonized pyrogenic polymer.

References Cited in the file of this patent
UNITED STATES PATENTS

| | | |
|---|---|---|
| 77,186 | Greene | Apr. 28, 1868 |

FOREIGN PATENTS

| | | |
|---|---|---|
| 10,864 | Great Britain | of 1896 |
| 463,511 | Great Britain | of 1937 |